UNITED STATES PATENT OFFICE.

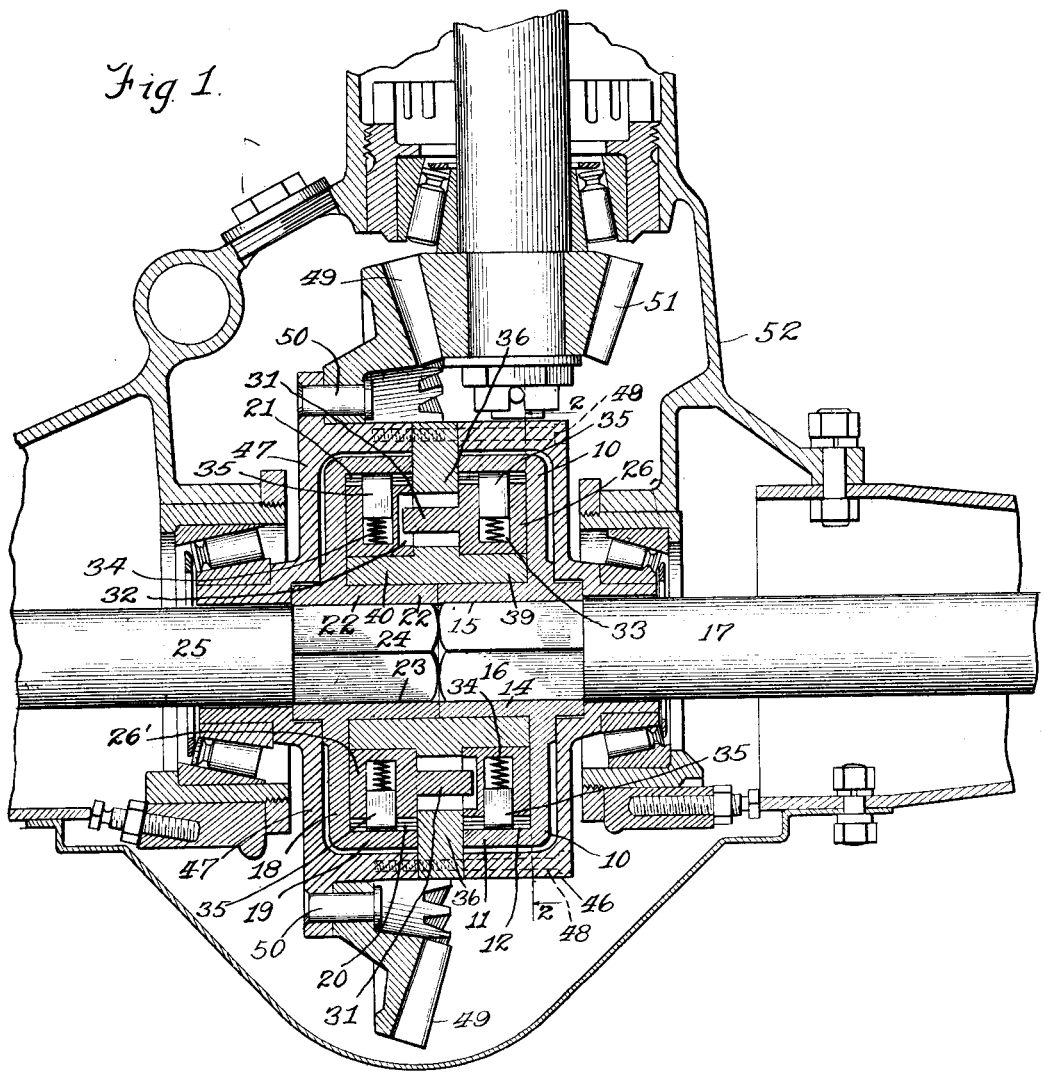

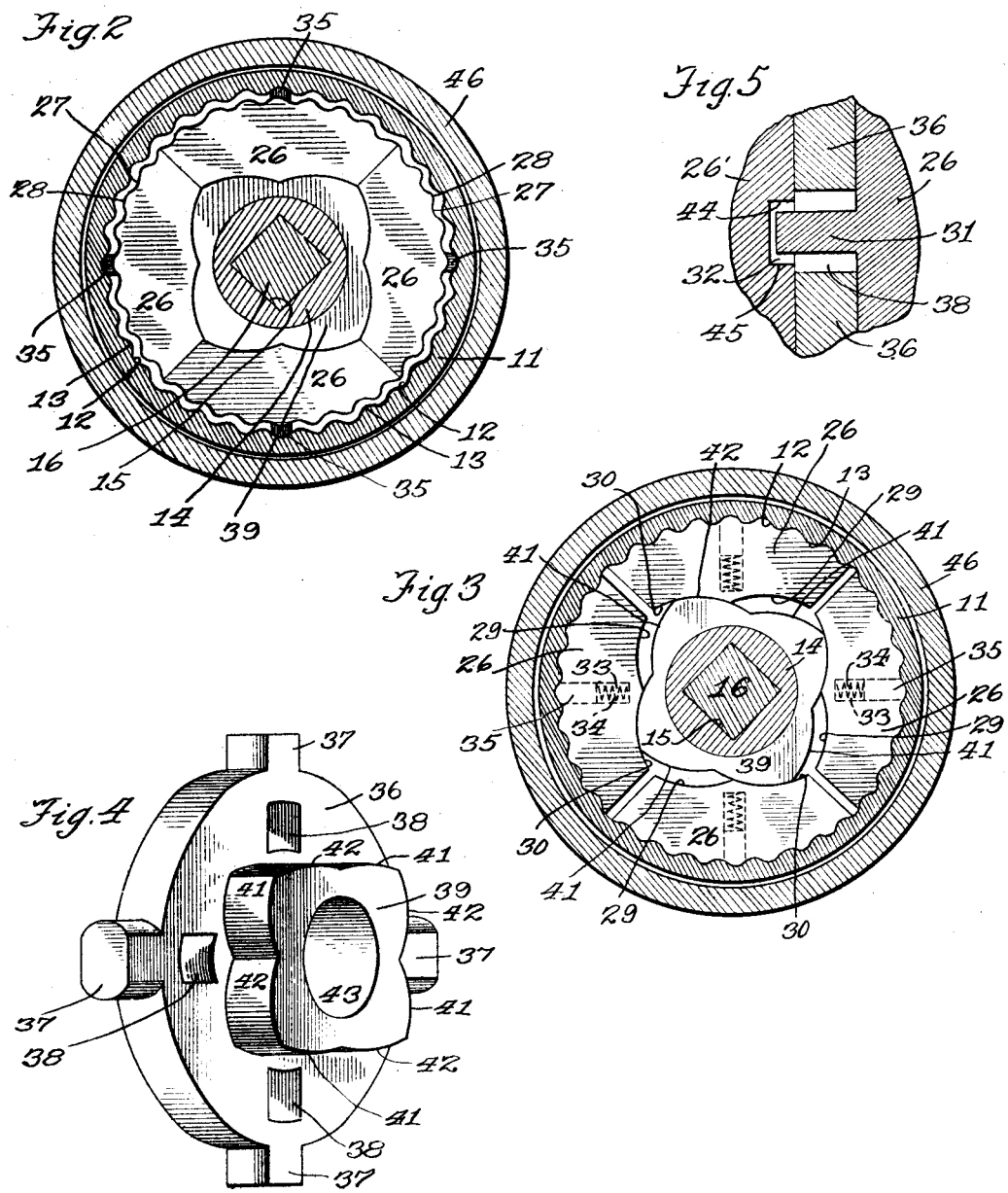

FRANK M. LEWIS, OF TRACY, ILLINOIS.

DIFFERENTIAL MECHANISM.

1,091,580.

Specification of Letters Patent. Patented Mar. 31, 1914.

Application filed April 5, 1913. Serial No. 756,654.

*To all whom it may concern:*

Be it known that I, FRANK M. LEWIS, a citizen of the United States of America, residing at Tracy, in the county of Cook and State of Illinois, have invented certain new and useful Improvements in Differential Mechanism, of which the following is a specification.

My invention relates to improvements in differential mechanism, and the objects of my improvement are, first, the provision of radially movable clutch-segments formed for positive engagement with a driven member; second, to provide a construction whereby relative rotative movement of the clutch-segments with a driven member is yieldably opposed; and, third, to afford a plurality of sets of clutch-segments carrying means to limit relative rotative movement of the respective set of segments.

With the foregoing and other objects in view, my invention consists in the novel features and in the novel combination and arrangement of parts hereinafter fully described, illustrated in the accompanying drawings forming a part of this specification, and particularly pointed out in the claims hereunto appended, it being understood that changes, variations and modifications in the details of the invention within the scope of the claims, may be resorted to without departing from the spirit or sacrificing any of the advantages thereof, hence I do not confine myself to the exact construction and arrangement of parts shown and described.

Figure 1 is a horizontal central section of a motor vehicle rear axle; Fig. 2 is a cross-sectional view on line 2—2 of Fig. 1 with cams disengaged; Fig. 3 is a similar view with the cams engaged in action; Fig. 4 is a perspective of the driving member; and Fig. 5 is a sectional detail of the means for limiting relative rotation of the shoes.

Similar numerals refer to similar parts throughout the several views.

10 denotes a drum or driven member having an inwardly extending flange 11, having an inner annular surface provided with corrugations or alternate grooves 12 and ribs 13 disposed transverse to the plane of rotation. The drum has a hub 14 with a square opening 15 therethrough to receive the square end 16 of the independent shaft 17.

18 designates a drum or driven member having an inwardly extending flange 19 having an inner annular surface provided with corrugations or alternate grooves 20, and ribs 21. This drum has a hub 22 with a square opening 23 therethrough to receive the square end 24 of the independent shaft 25.

Two sets of what is termed clutch-segments 26 and 26' are provided. The several segments are formed alike and a description of one segment is a description of each segment. Preferably four radially movable segments are disposed on each side of a driving member hereinafter described, but the dimensions may be varied and fewer or more segments may be used, as desired. Each segment has circumferential grooves 27 and ribs 28 for positive engagement with a driven member, and each segment has working or cam faces 29 and 30. Preferably, each segment carries post 31 and post-recess 32, and recess 33 with compression spring 34 therein and bolt 35 with round or cam shaped out end.

36 indicates a driving member with radial studs 37 concentric slots 38 and double cams 39 and 40 positioned on the respective sides of the driver 36. The faces 41 and 42 of the cams are adapted to operate against the faces 29 and 30 of the segments to move them radially into positive engagement with the respective drums or driven members. The opening 43 in the driver is to receive the hubs 14 and 22 of the drums.

In Fig. 5 the post-recess has walls 44 and 45 to limit the extent of travel of the free end of post 31 in recess 32, to prevent movement of the segment which carries the post far enough to lock one vehicle wheel against the other.

46 and 47 represent the two halves of a rotatable housing bolted together at 48. The bevel gear wheel 49 is riveted to the housing at 50 and meshes with the pinion 51, on the engine shaft, (not shown) which is journaled in non-rotatable housing 52.

While the present embodiment is applied to the rear axle or to a jack-shaft of a motor vehicle, my invention is capable of application to each driving vehicle wheel.

In operation when power is applied to the rotatable housing the driving member 36 will be moved in the direction of rotation. The cams 39 and 40 will operate against the faces 29 and 30 to move radially the segments 26 and 26' into positive engagement with the respective driven members resulting in a positive two wheel drive.

In turning a corner the outside vehicle wheel will rotate faster than the driving member and the cams and working faces on the segment will at once move to neutral position shown in Fig. 2 and the outside vehicle wheel will be free to rotate until the speeds of the driving member and this vehicle wheel are alike when reëngagement will take place and both vehicle wheels will be positively driven.

The inside wheel when describing a curve, as above stated, will remain in power transmission engagement, hence the post 31 will contact or interfere with wall 44 or 45 of the post-recess 32, depending upon the direction of rotation of the vehicle, backward or forward, and thus limit the relative rotative movement of the sets of segments and prevent the segments set free by the outside vehicle wheel running from moving sufficiently ahead to lock one wheel against the other. The means to oppose relative rotative movement of each segment with its driven member acts as a drag or brake and tends to stop the movement of the segment at a point to register for positive engagement of the ribs and grooves of the two. The force of the compression springs 34 urges the segment out of positive engagement when the cam on the driving member will permit.

Having thus fully described my invention, what I claim as new, and desire to secure by Letters-Patent, is,—

1. In differential mechanism, in combination, a shaft, a driven member having a corrugated annular surface fixed to the shaft, a plurality of clutch-segments having circumferential ribs and grooves transverse to the plane of rotation and cam faces and means operable against the cam faces of the clutch-segments to move them radially into positive engagement with the driven member.

2. In differential mechanism, in combination, independent shafts, a driven member with a corrugated annular surface fixed to each shaft, a plurality of sets of clutch-segments having circumferential ribs and grooves transverse to the plane of rotation, and means carried by the respective sets of clutch-segments to limit relative rotative movement thereof.

3. In differential mechanism, in combination, independent shafts, a driven member with a corrugated annular surface fixed thereto, a driving member carrying on both sides a plurality of double cams, a plurality of sets of clutch-segments, and means carried by the segments to limit relative rotative movement thereof.

4. In differential mechanism, in combination, independent shafts, a driven member having a corrugated annular surface fixed to the opposing ends of each of the two shafts, a driving member carrying on both sides a plurality of double cams, a plurality of sets of clutch segments each having circumferential ribs and grooves transverse to the plane of rotation and cam faces, means to limit relative rotative movement of the sets of segments, and means carried by each segment to oppose relative rotative movement of each segment with the driven member.

5. In differential mechanism, in combination, independent shafts, a driven member having a corrugated annular surface fixed to the opposing ends of each of the two shafts, a plurality of sets of clutch segments each having circumferential ribs and grooves transverse to the plane of rotation and cam faces, a driving member carrying on both sides a plurality of double cams to move the clutch-segments radially into positive engagement with the respective driven members, means to limit relative rotative movement of the sets of clutch-segments, a rotatable housing and means to rotate the rotatable housing.

In testimony whereof I affix my signature in presence of two witnesses.

FRANK M. LEWIS.

Witnesses:
SCOTT M. HOGAN,
B. F. STOUT.